(12) United States Patent
Wong et al.

(10) Patent No.: US 8,081,186 B2
(45) Date of Patent: Dec. 20, 2011

(54) SPATIAL EXPLORATION FIELD OF VIEW PREVIEW MECHANISM

(75) Inventors: Curtis Glenn Wong, Medina, WA (US); Jonathan Edgar Fay, Woodinville, WA (US); David M Folchi, Everett, WA (US); Robert M Girling, Woodinville, WA (US); Prarthana Panchal, Shoreline, WA (US); Martijn E VanTilburg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 11/941,097

(22) Filed: Nov. 16, 2007

(65) Prior Publication Data

US 2009/0128565 A1    May 21, 2009

(51) Int. Cl.
*G06T 17/00* (2006.01)
*G02B 23/00* (2006.01)
(52) U.S. Cl. ........................... 345/428; 359/400
(58) Field of Classification Search .................. 345/428; 359/400
See application file for complete search history.

(56) References Cited

U.S. PATENT DOCUMENTS

| | | | | |
|---|---|---|---|---|
| 5,396,583 A * | 3/1995 | Chen et al. | ........... | 345/427 |
| 5,473,746 A * | 12/1995 | Pritt et al. | ........... | 715/784 |
| 5,519,673 A * | 5/1996 | Uehara et al. | ........... | 368/15 |
| 5,555,354 A * | 9/1996 | Strasnick et al. | ........... | 345/427 |
| 5,617,332 A * | 4/1997 | Fressola | ........... | 345/13 |
| 5,830,066 A * | 11/1998 | Goden et al. | ........... | 463/33 |
| 5,850,352 A | 12/1998 | Moezzi et al. | | |
| 5,864,337 A | 1/1999 | Marvin | | |
| 5,936,633 A * | 8/1999 | Aono et al. | ........... | 345/589 |
| 5,987,363 A * | 11/1999 | Quan et al. | ........... | 701/13 |
| 6,020,885 A * | 2/2000 | Honda | ........... | 715/757 |
| 6,057,856 A * | 5/2000 | Miyashita et al. | ........... | 345/633 |
| 6,094,196 A * | 7/2000 | Berry et al. | ........... | 715/852 |
| 6,100,897 A | 8/2000 | Mayer et al. | | |
| 6,121,969 A | 9/2000 | Jain et al. | | |
| 6,216,133 B1 | 4/2001 | Masthoff | | |
| RE37,356 E * | 9/2001 | Hori et al. | ........... | 600/103 |
| 6,301,586 B1 | 10/2001 | Yang et al. | | |
| 6,321,158 B1 | 11/2001 | DeLorme et al. | | |
| 6,331,853 B1 * | 12/2001 | Miyashita | ........... | 345/427 |
| 6,346,938 B1 * | 2/2002 | Chan et al. | ........... | 345/419 |
| 6,400,375 B1 | 6/2002 | Okudaira | | |
| 6,525,732 B1 * | 2/2003 | Gadh et al. | ........... | 345/428 |
| 6,545,687 B2 | 4/2003 | Scott et al. | | |
| 6,776,618 B1 * | 8/2004 | D'Zmura | ........... | 434/106 |

(Continued)

OTHER PUBLICATIONS

StarPlot: A 3-Dimensional Star Chart Viewer; Oct. 11, 2006; pp. 1-30.*

(Continued)

*Primary Examiner* — Kee M Tung
*Assistant Examiner* — David T Welch
(74) *Attorney, Agent, or Firm* — L. Alan Collins; Collins & Collins Incorporated

(57) ABSTRACT

Indicators operable to preview or show the position and relative zoom level of a field of view within a virtual space. Virtual space exploration tools typically make use of a field of view for limiting a user's view of the virtual space and zooming in on a portion of the virtual space. A spherical indicator is provided to show the current position of the field of view within the virtual space, as well as provide an indication of level of zoom. A local field of view indication is also provided to show the current position of the field of view, as well as provide an indication of level of zoom, with respect to a nearby object within the virtual space. Such indicators may be useful in exploring outer space as well as landscapes and any other spaces.

18 Claims, 6 Drawing Sheets

U.S. PATENT DOCUMENTS

| | | | |
|---|---|---|---|
| 7,069,506 | B2 | 6/2006 | Rosenholtz et al. |
| 7,072,764 | B2 | 7/2006 | Donath et al. |
| 7,096,428 | B2 | 8/2006 | Foote et al. |
| 7,158,878 | B2 | 1/2007 | Rasmussen et al. |
| 7,213,214 | B2 | 5/2007 | Baar et al |
| 7,257,261 | B2 | 8/2007 | Suh |
| 7,646,394 | B1 * | 1/2010 | Neely et al. ............... 345/633 |
| 2002/0029226 | A1 | 3/2002 | Li et al. |
| 2002/0093541 | A1 | 7/2002 | Schileru-Key |
| 2002/0109680 | A1 | 8/2002 | Orbanes et al. |
| 2002/0141659 | A1 * | 10/2002 | Florin et al. ............... 382/285 |
| 2003/0151605 | A1 | 8/2003 | Dominici |
| 2003/0210281 | A1 | 11/2003 | Ellis et al. |
| 2003/0222901 | A1 | 12/2003 | Houck et al. |
| 2004/0205628 | A1 | 10/2004 | Rosenholtz et al. |
| 2005/0021677 | A1 * | 1/2005 | Musha et al. ............... 709/218 |
| 2005/0210399 | A1 | 9/2005 | Filner et al. |
| 2006/0158722 | A1 * | 7/2006 | Fujimoto et al. ............ 359/399 |
| 2006/0187223 | A1 * | 8/2006 | Yamaguchi et al. ......... 345/426 |
| 2006/0236251 | A1 | 10/2006 | Kataoka et al. |
| 2006/0271280 | A1 | 11/2006 | O'Clair |
| 2007/0097246 | A1 * | 5/2007 | Adams ..................... 348/333.01 |
| 2007/0118818 | A1 | 5/2007 | Gunderson et al. |
| 2007/0150186 | A1 | 6/2007 | Ingulsrud |
| 2007/0183685 | A1 * | 8/2007 | Wada et al. ............... 382/285 |
| 2007/0247439 | A1 * | 10/2007 | Daniel et al. ............... 345/173 |
| 2008/0024523 | A1 * | 1/2008 | Tomite et al. ............... 345/632 |
| 2008/0062202 | A1 * | 3/2008 | Schulz et al. ............... 345/665 |
| 2008/0091654 | A1 * | 4/2008 | Kang et al. .................. 707/3 |

OTHER PUBLICATIONS

Roussopoulos, et al., "Direct Spatial Search on Pictorial Databases Using Packed R-trees", vol. 14, Issue 4, May 1985, ACM, pp. 17-31.

Kuipers, et al., "A Robot Exploration and Mapping Strategy Based on a Semantic Hierarchy of Spatial Representations", Journal of Robotics and Autonomous Systems, MIT Press, 1991, pp. 1-23.

Engelen, et al., "Environment Explorer: Spatial Support System for the Integrated Assessment of Socio-Economic and Environmental Policies in the Netherlands", First Biennial Conference of the International Environmental Modelling and Software Society, Jun. 2002, pp. 12.

Gray, et al., "The World-Wide Telescope, an Archetype for Online Science", Technical Report, Microsoft Research, Jun. 2002, pp. 6.

"Views", retrieved on Aug. 29, 2007 at <<http://www-03.ibm.com/easy/page/91>>, pp. 1-7.

"Star Dome Help", Kalmbach Publishing Co., 2007, pp. 1-3.

"Census 2000 Mapping Help", retrieved on Aug. 29, 2007 at <<http://marineeconomics.noaa.gov/socioeconomics/Help/census2000_overview.html>>, pp. 1-5.

"A Brief Orientation", retrieved on Aug. 29, 2007 at << http://www.edc.uri.edu/Eelgrass/brieforientation.html>>, p. 1.

"Making Sense of Geographic Data with Dundas Map and AJAX", Dundas Software, 2006, pp. 1-5.

Lam, et al., "Summary Thumbnails: Readable Overviews for Small Screen Web Browsers", CHI 2005, Apr. 2-7, 2005, ACM, pp. 681-690.

"Thumbnail Preview in Object Selection", MicroImages Inc., © MicroImages, Inc. 2007, p. 1.

Czerwinski, et al., "The Contribution of Thumbnail Image, Mouse-over Text and Spatial Location Memory to Web Page Retrieval in 3D", Microsoft Research, 1999, pp. 8.

Cockborn, et al., "Faster Document Navigation with Space-Filling Thumbnails", CHI 2006, Apr. 22-27, 2006, ACM, pp. 10.

* cited by examiner ns. The description sets forth at least some of the
SPATIAL EXPLORATION FIELD OF VIEW PREVIEW MECHANISM

BACKGROUND

When exploring spatial environments using virtual browsing tools, it can be difficult to determine a current position relative to the overall environment. For example, when looking at a map at a high zoom level, it can be difficult to know where you are looking. Or, when exploring outer space with a relatively narrow field of view, it can be difficult to know what portion of the sky is being explored.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide indicators operable to preview or show the position and relative zoom level of a field of view within a virtual space. Virtual space exploration tools typically make use of a field of view for limiting a user's view of the virtual space and zooming in on a portion of the virtual space. A spherical indicator is provided to show the current position of the field of view within the virtual space, as well as provide an indication of level of zoom. A local field of view indication is also provided to show the current position of the field of view, as well as provide an indication of level of zoom, with respect to a nearby object within the virtual space. Such indicators may be useful in exploring outer space as well as landscapes and any other spaces.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like elements in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
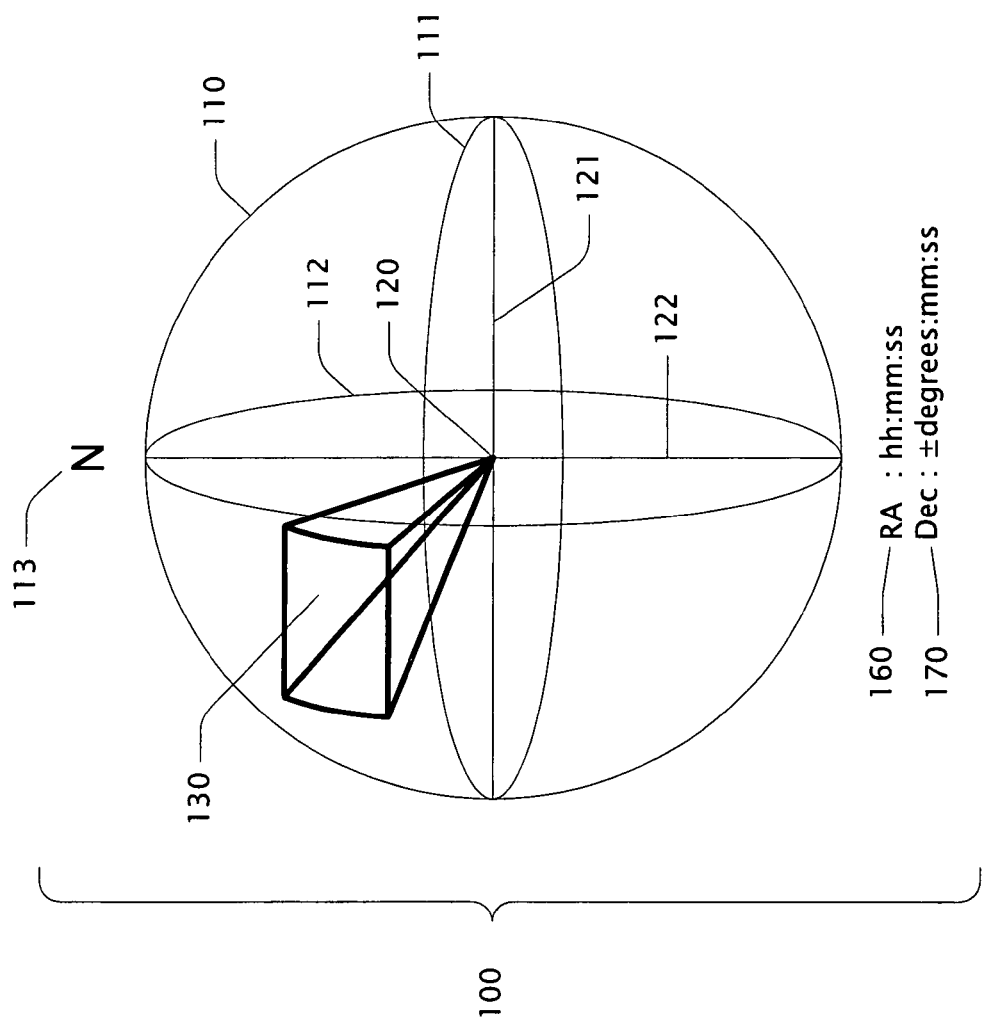
FIG. 1 is a block diagram showing a schematic diagram of an example spherical indicator.

FIG. 1 is a block diagram showing a schematic diagram of an example spherical indicator 100. Such an indicator may be used to provide a "you are here" view indicating the portion of some spatial environment being viewed when using a virtual space browsing tool or the like. In one example of indicator 100, included is a translucent sphere 110 with ovals 111 and 112 to aid in providing a spherical appearance when displayed in two dimensions. Further included are lines 121 and 122 which provide for a visual center point 120 of sphere 110. Sphere 110 typically represents an imaginary rotating sphere of gigantic radius, concentric and coaxial with the Earth, or some other body, located at center point 120. Oval 111 is typically thought of as the celestial equator projected from the body at center point 120. Line 122 is typically considered the celestial pole projected from the body at center point 120. Symbol 'N' 113 indicates the north pole of sphere 110 and the body at center point 120.

When browsing a virtual space all objects in the sky and/or surroundings may be thought of as lying on sphere 110. When using a virtual space browsing tool to view such a sky and/or surroundings, indicator 100 typically indicates the position of the current field of view ("FOV") of the browsing tool. In one example, indicator 100 shows the FOV as a projection 130 onto the surface of sphere 110 from center point 120. The relative size of projection 130 is typically an indication of the relative zoom of the current FOV. For example, a larger projection generally indicates a lesser level of zoom and a smaller projection a greater level of zoom. Examples of zoom levels and corresponding projection sizes are provided in connection with FIGS. 4 and 5.

Indicator 100 typically includes positional information for the current FOV. In one example of positional information, right ascension ("RA") 160 is one of two conventional coordinates used, displayed using an hours, minutes, seconds format or the like. The second of the two conventional coordinates used is declination ("Dec"), displayed using a +/− degrees, minutes, seconds format or the like. These two conventional coordinates may be used to indicate the position of the current FOV on sphere 110. Indicator 100 may thus be used to provide an indication of the position and relative zoom of a current FOV of a virtual space browsing tool or the like.

The term "virtual space" as used herein generally refers to a representation of some space, actual or imaginary, from a particular point of reference, such as outer space (the Earth, for example, being the point of reference) or some other space surrounding a particular point of reference (some point on the Earth, for example). The term "spatial environment" as used herein generally refers to a virtual space, real space, and/or imaginary space. Such spaces may, for example, be galactic, subatomic, or of any scope in-between.

Figure 2:
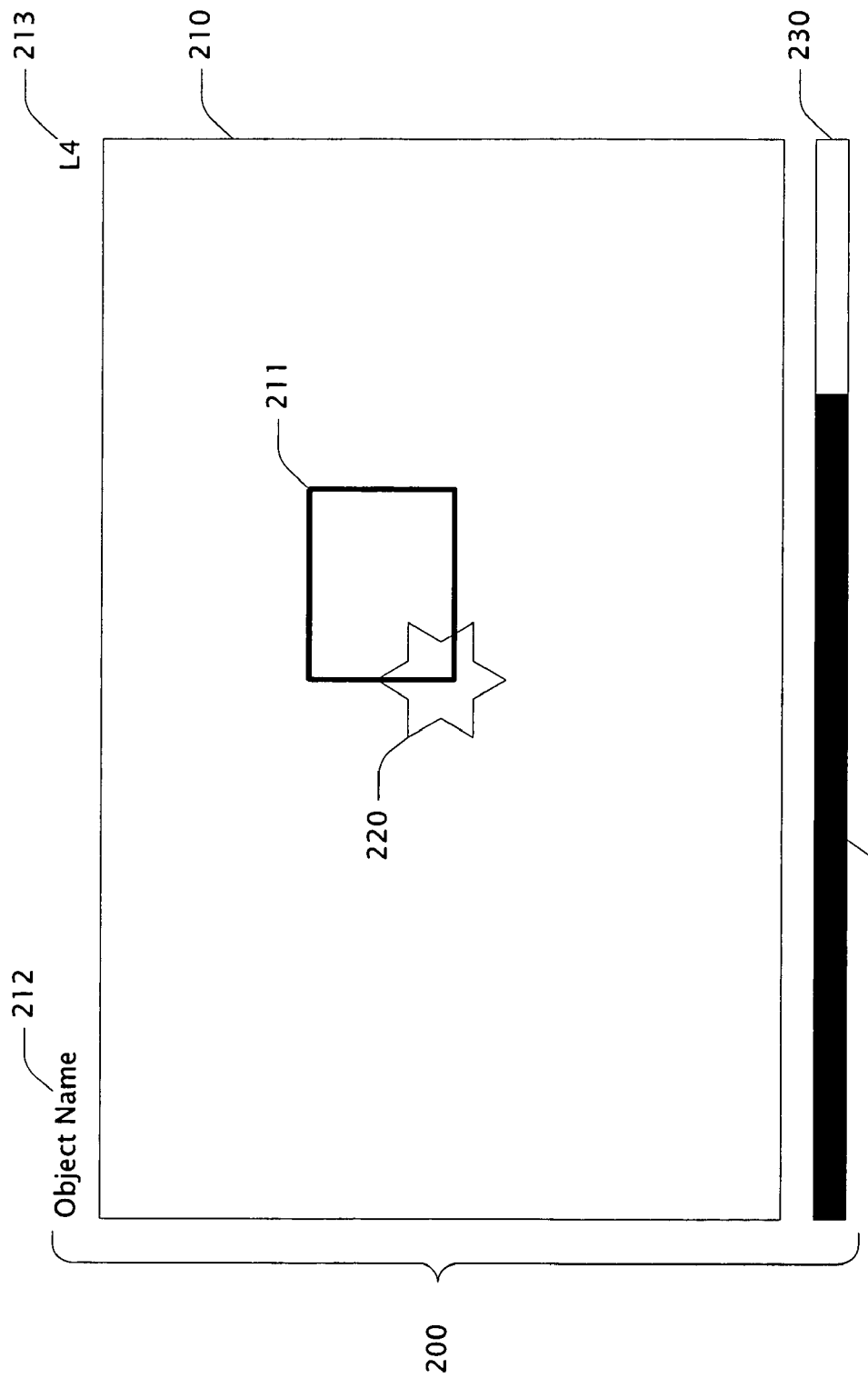
FIG. 2 is a block diagram showing a schematic diagram of an example local field of view indicator.

FIG. 2 is a block diagram showing a schematic diagram of an example local field of view indicator 200. Such an indicator may be used to provide a "you are here" view with respect to a nearby object 220 in a portion of the sky and/or surroundings being viewed when using a virtual space browsing tool or the like. In one example, indicator 200 includes area 210 typically showing an object 220 nearby the current FOV 211 position. Object 220 is typically centered in area 210 and the position of the current FOV 211 is typically shown relative to object 220. Object 220 may be a representation of an object, an image of an object, or the like. The size of FOV 211 typically provides a relative indication of level of zoom. Symbol "L4" 213 also typically provides a relative indication of the level of zoom, lower numbers typically indicating less zoom and higher number more zoom. Further, zoom indicator 230 may also provide a visual indication of the relative level of zoom with fill line 232 indicating less zoom when more toward the left and more zoom when more toward the right. Object Name field 212 typically presents the name or other information of object 220. Indicator 200 may thus be used to indicate the position of the current FOV relative to a nearby object in the virtual space of a virtual space browsing tool or the like.

Figure 3:
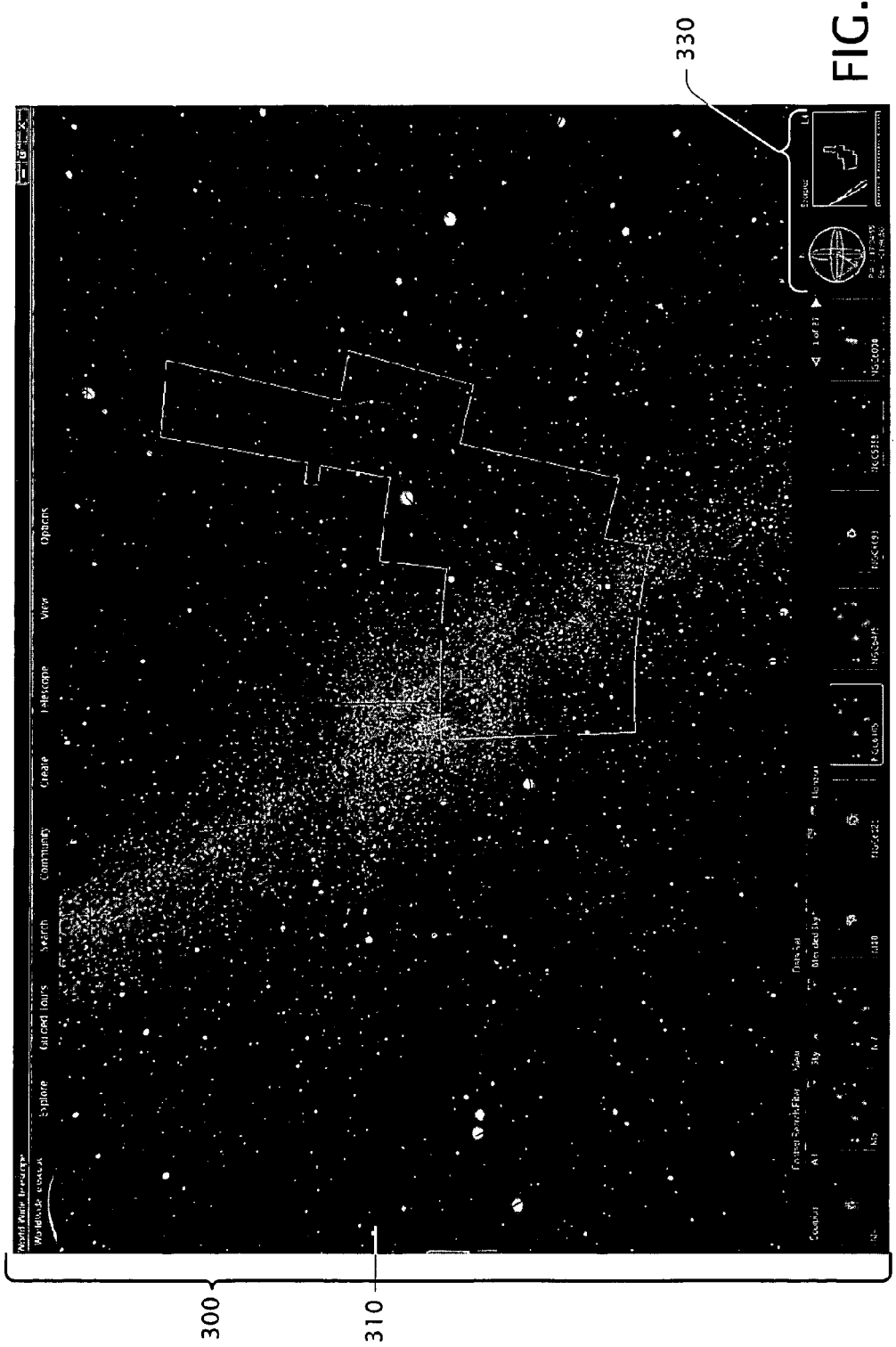
FIG. 3 is a static image example of a virtual space presentation interface of a virtual space browsing tool including example spherical and local indicators.

FIG. 3 is a static image example of a virtual space presentation interface 300 of a virtual space browsing tool including example spherical and local indicators 330. Example 300 includes a current field of view ("FOV") 310 of the virtual space which, in this example, is of outer space. A user may generally explore the virtual space by moving the FOV to a desired location in the virtual space via suitable user interface mechanisms. Further, the user may zoom in or out of the virtual space as desired, thus narrowing or widening FOV 310 respectively. Example spherical and local indicators 330, such as described in connection with FIGS. 1 and 2, may indicate the current FOV position within the virtual space.

Figure 4:
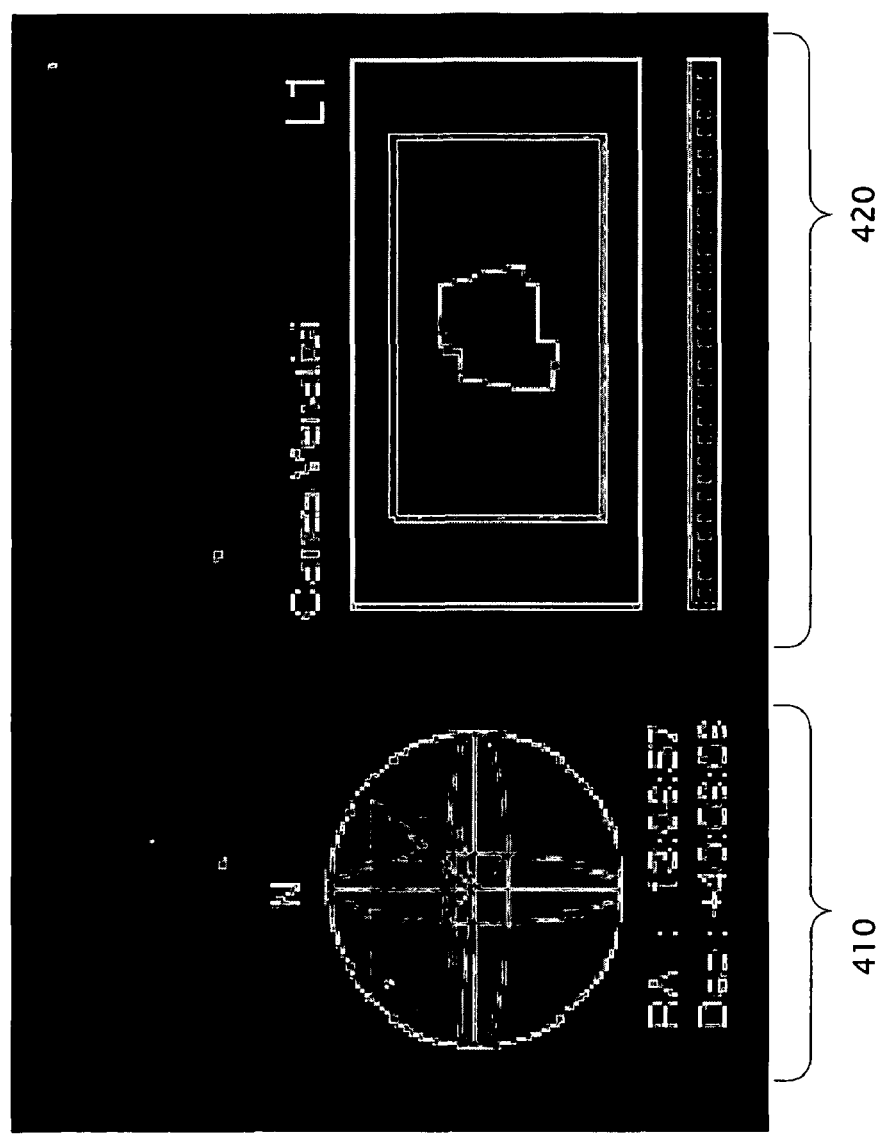
FIG. 4 is a static image example of spherical and local indicators.

FIG. 4 is a static image example of spherical and local indicators. In this example, local indicator 420 is centered on a representation of the Canes Venatici constellation with relatively little zoom and a relatively wide FOV, the FOV also centered on the representation of the Canes Venatici constellation. Further, spherical indicator 410 shows a projection of the current FOV including values for corresponding RA and Dec, again indicating a relatively wide FOV.

Figure 5:
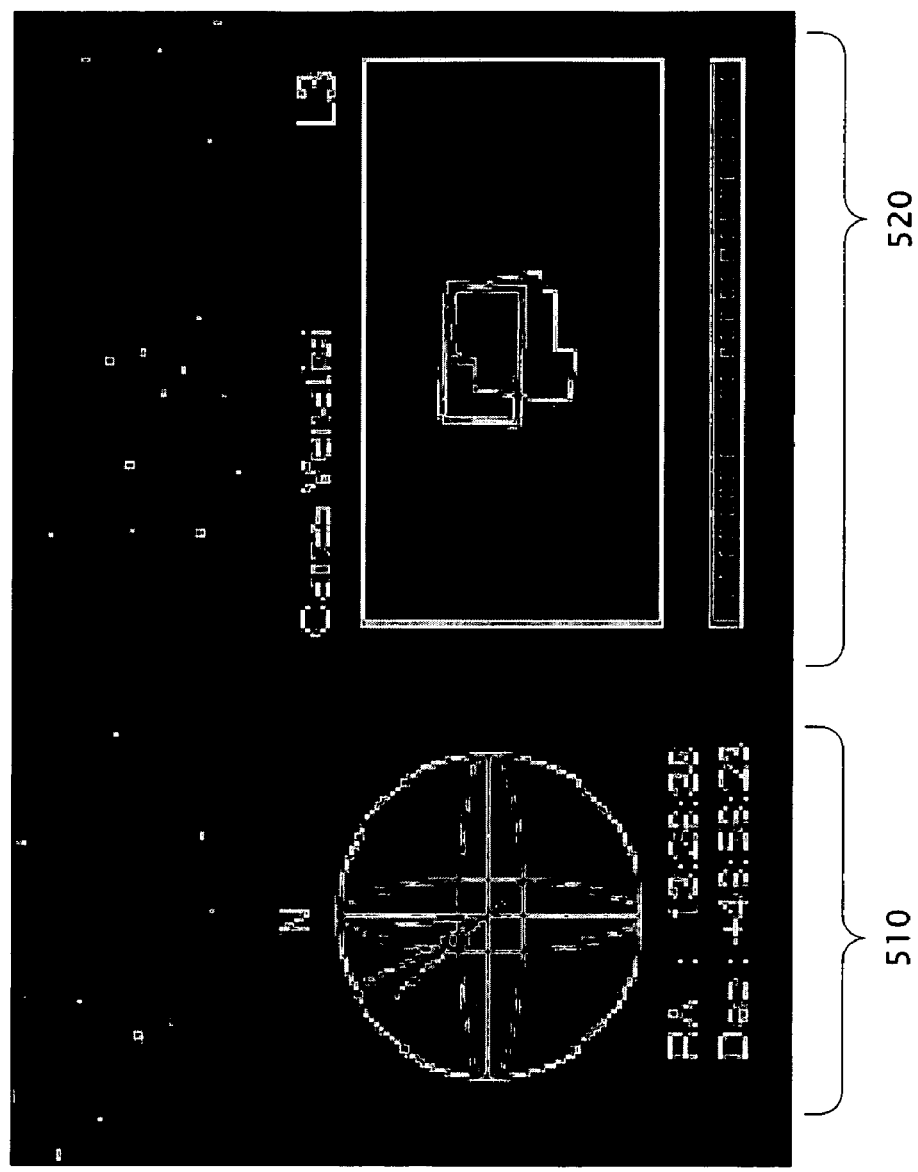
FIG. 5 is another static image example of spherical and local indicators.

FIG. 5 is another static image example of spherical and local indicators. In this example, local indicator 520 is centered on a representation of the Canes Venatici constellation, this time with more zoom and a narrower FOV when compared with FIG. 4. Further, spherical indicator 510 shows a projection of the current FOV including values for corresponding RA and Dec, again indicating a narrower wide FOV when compared with FIG. 4.

Figure 6:
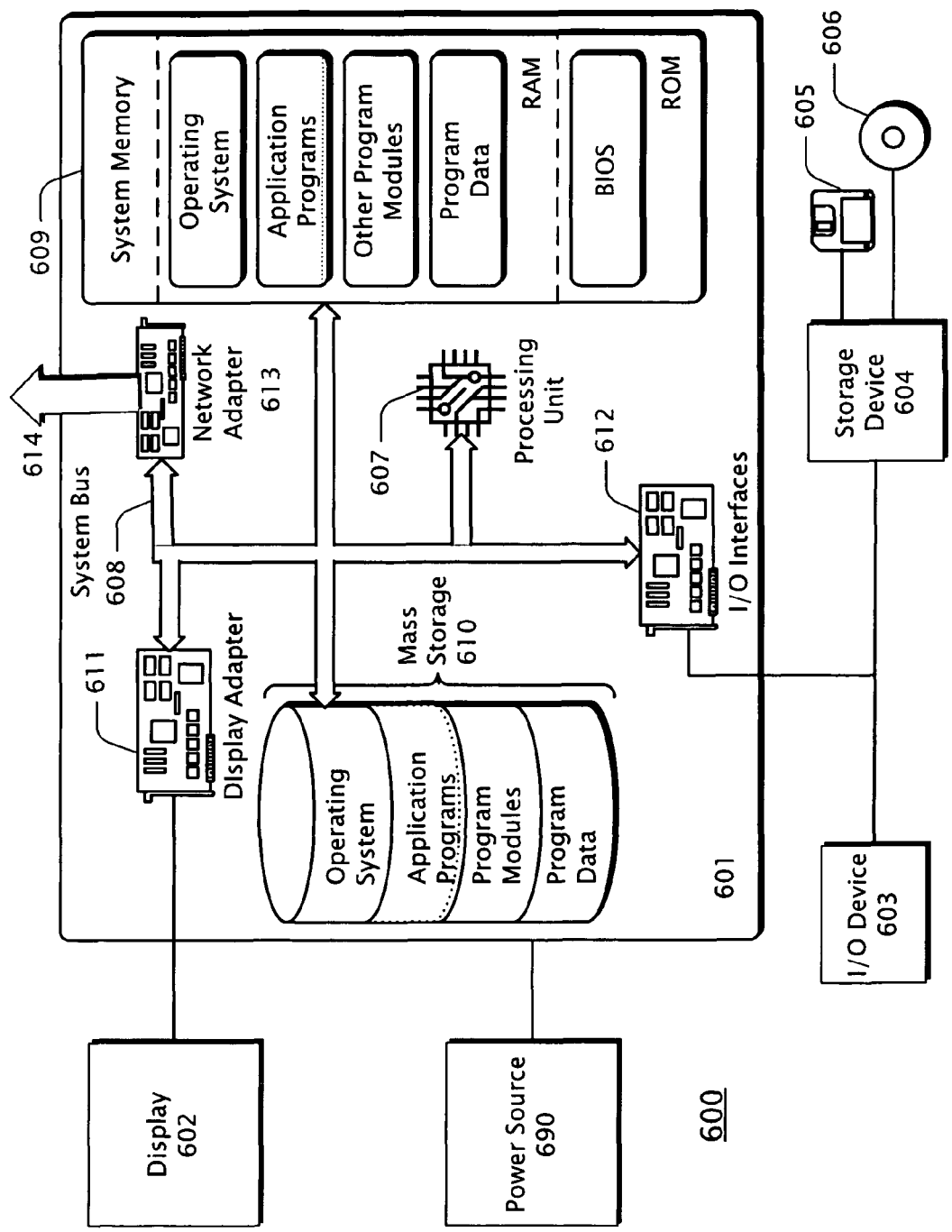
FIG. 6 is a block diagram showing an example computing environment in which the technologies described herein may be implemented.

FIG. 6 is a block diagram showing an example computing environment 600 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 600 typically includes a general-purpose computing system in the form of a computing device 601 coupled to various components, such as peripheral devices 602, 603, 604 and the like. System 600 may couple to various other components, such as input devices 603, including voice recognition, touch pads, buttons, keyboards and/or pointing devices, such as a mouse or trackball, via one or more input/output ("I/O") interfaces 612. The components of computing device 601 may include one or more processors (including central processing units ("CPU"), graphics processing units ("GPU"), microprocessors ("µP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include non-volatile RAM, a magnetic disk drive which reads from and/or writes to a removable, non-volatile magnetic disk (e.g., a "floppy disk") 605, and/or an optical disk drive that reads from and/or writes to a non-volatile optical disk such as a CD ROM, DVD ROM 606. Alternatively, a mass storage device, such as hard disk 610, may include non-removable storage medium. Other mass storage devices may include memory cards, memory sticks, tape storage devices, and the like.

Any number of computer programs, files, data structures, and the like may be stored in mass storage 610, other storage devices 604, 605, 606 and system memory 609 (typically limited by available space) including, by way of example and not limitation, operating systems, application programs, data files, directory structures, computer-executable instructions, and the like.

Output components or devices, such as display device 602, may be coupled to computing device 601, typically via an interface such as a display adapter 611. Output device 602 may be a liquid crystal display ("LCD"). Other example output devices may include printers, audio outputs, voice outputs, cathode ray tube ("CRT") displays, tactile devices or other sensory output mechanisms, or the like. Output devices may enable computing device 601 to interact with human operators or other machines, systems, computing environments, or the like. A user may interface with computing environment 600 via any number of different I/O devices 603 such as a touch pad, buttons, keyboard, mouse, joystick, game pad, data port, and the like. These and other I/O devices may be coupled to processor 607 via I/O interfaces 612 which may be coupled to system bus 608, and/or may be coupled by other interfaces and bus structures, such as a parallel port, game port, universal serial bus ("USB"), fire wire, infrared ("IR") port, and the like.

Computing device 601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 690, such as a battery or a power supply, typically provides power for portions or all of computing environment 600. In the case of the computing environment 600 being a mobile device or portable device or the like, power source 690 may be a battery. Alternatively, in the case computing environment 600 is a desktop computer or server or the like, power source 690 may be a power supply designed to connect to an alternating current ("AC") source, such as via a wall outlet.

Some mobile devices may not include many of the components described in connection with FIG. 6. For example, an electronic badge may be comprised of a coil of wire along with a simple processing unit 607 or the like, the coil configured to act as power source 690 when in proximity to a card reader device or the like. Such a coil may also be configure to act as an antenna coupled to the processing unit 607 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 602, I/O device 603, or many of the other components described in connection with FIG. 6. Other mobile devices that may not include many of the components described in connection with FIG. 6, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. At least one computer-readable media storing instructions that, when executed by a computer, cause the computer to perform a method for implementing a set of indicators configured for indicating a position and relative zoom level of a field of view in a corresponding spatial environment, the set of indicators comprising:
    a spherical indicator rendered on a two-dimensional display, the spherical indicator including:
        a circle including an oval between the two horizontal-most points of the circle, the circle representing a sphere of the spherical indicator, the oval representing a celestial equator of the spherical indicator, and
        a line between the two vertical-most points of the circle, the line representing a celestial pole of the spherical indicator, and
        a center point of the spherical indicator from which a rectangular projection of the field of view is rendered within the spherical indicator, wherein the area of the rectangular projection of the field of view provides an indication of a relative zoom level, and
        a North indication associated with the celestial pole, and
        a Right Ascension indication associated with the rectangular projection of the field of view, and
        a Declination indication associated with the rectangular projection of the field of view; and
    a local field of view indicator rendered on the two-dimensional display, the local field of view indicator including:
        a rectangular area configured to present a representation of an object of the corresponding spatial environment and to provide a preview of the field of view, and
        a representation of the field of view in the form of a rectangle oriented within the rectangular area within the corresponding spatial environment relative to the representation of the object, the representation of the field of view corresponding to the rectangular projection of the field of view, wherein the rectangular area of the representation of the field of view provides an indication of the relative zoom level of the field of view in the corresponding spatial environment, and
        a presentation of a name of the object.

2. The at least one computer-readable media of claim 1 wherein the Right Ascension indication is a value presented in an hours, minutes, seconds format.

3. The at least one computer-readable media of claim 1 wherein the Declination indication is a value presented in a degrees, minutes, seconds format.

4. The at least one computer-readable media of claim 1 wherein the corresponding spatial environment is a virtual space representing outer space.

5. The at least one computer-readable media of claim 1 wherein the projection of the field of view is scaled and oriented in the spherical indicator corresponding to the field of view in the corresponding spatial environment.

6. The at least one computer-readable media of claim 1 wherein the representation of the field of view is scaled and oriented in the local field of view indicator relative to the object corresponding to the field of view in the corresponding spatial environment.

7. A method comprising:
implementing, by a computer, a set of indicators configured for indicating a position and relative zoom level of a field of view in a corresponding spatial environment, the set of indicators comprising:
a spherical indicator rendered on a two-dimensional display, the spherical indicator including:
a circle including an oval between the two horizontal-most points of the circle, the circle representing a sphere of the spherical indicator, the oval representing a celestial equator of the spherical indicator, and
a line between the two vertical-most points of the circle, the line representing a celestial pole of the spherical indicator, and
a center point of the spherical indicator from which a rectangular projection of the field of view is rendered within the spherical indicator, wherein the area of the rectangular projection of the field of view provides an indication of a relative zoom level, and
a North indication associated with the celestial pole, and
a Right Ascension indication associated with the rectangular projection of the field of view, and
a Declination indication associated with the rectangular projection of the field of view; and
a local field of view indicator rendered on the two-dimensional display, the local field of view indicator including:
a rectangular area configured to present a representation of an object of the corresponding spatial environment and to provide a preview of the field of view, and
a representation of the field of view in the form of a rectangle oriented within the rectangular area within the corresponding spatial environment relative to the representation of the object, the representation of the field of view corresponding to the rectangular projection of the field of view, wherein the rectangular area of the representation of the field of view provides an indication of the relative zoom level of the field of view in the corresponding spatial environment, and
a presentation of a name of the object.

8. The method of claim 7 wherein the Right Ascension indication is a value presented in an hours, minutes, seconds format.

9. The method of claim 7 wherein the Declination indication is a value presented in a degrees, minutes, seconds format.

10. The method of claim 7 wherein the corresponding spatial environment is a virtual space representing outer space.

11. The method of claim 7 wherein the projection of the field of view is scaled and oriented in the spherical indicator corresponding to the field of view in the corresponding spatial environment.

12. The method of claim 7 wherein the representation of the field of view is scaled and oriented in the local field of view indicator relative to the object corresponding to the field of view in the corresponding spatial environment.

13. A system comprising: a computer configured for implementing a set of indicators configured for indicating a position and relative zoom level of a field of view in a corresponding spatial environment, the set of indicators comprising:
a spherical indicator rendered on a two-dimensional display, the spherical indicator including:
a circle including an oval between the two horizontal-most points of the circle, the circle representing a sphere of the spherical indicator, the oval representing a celestial equator of the spherical indicator, and
a line between the two vertical-most points of the circle, the line representing a celestial pole of the spherical indicator, and
a center point of the spherical indicator from which a rectangular projection of the field of view is rendered within the spherical indicator, wherein the area of the rectangular projection of the field of view provides an indication of a relative zoom level, and
a North indication associated with the celestial pole, and
a Right Ascension indication associated with the rectangular projection of the field of view, and
a Declination indication associated with the rectangular projection of the field of view; and
a local field of view indicator rendered on the two-dimensional display, the local field of view indicator including:
a rectangular area configured to present a representation of an object of the corresponding spatial environment and to provide a preview of the field of view, and
a representation of the field of view in the form of a rectangle oriented within the rectangular area within the corresponding spatial environment relative to the representation of the object, the representation of the field of view corresponding to the rectangular projection of the field of view, wherein the rectangular area of the representation of the field of view provides an indication of the relative zoom level of the field of view in the corresponding spatial environment, and
a presentation of a name of the object.

14. The system of claim 13 wherein the Right Ascension indication is a value presented in an hours, minutes, seconds format.

15. The system of claim 13 wherein the Declination indication is a value presented in a degrees, minutes, seconds format.

16. The system of claim 13 wherein the corresponding spatial environment is a virtual space representing outer space.

17. The system of claim 13 wherein the projection of the field of view is scaled and oriented in the spherical indicator corresponding to the field of view in the corresponding spatial environment.

18. system of claim 13 wherein the representation of the field of view is scaled and oriented in the local field of view indicator relative to the object corresponding to the field of view in the corresponding spatial environment.

* * * * *